United States Patent
Nitsch

(10) Patent No.: US 7,233,586 B2
(45) Date of Patent: Jun. 19, 2007

(54) PROCEDURE FOR THE DETERMINATION OF THE LENGTH OF A STANDARD CODE SEQUENCE OF A CDMA SIGNAL

(75) Inventor: Bernhard Nitsch, Munich (DE)

(73) Assignee: Rhode & Schwarz GmbH & Co. KG, Munich (DE)

( * ) Notice: Subject to any disclaimer, the term of this patent is extended or adjusted under 35 U.S.C. 154(b) by 984 days.

(21) Appl. No.: 10/424,879

(22) Filed: Apr. 28, 2003

(65) Prior Publication Data

US 2003/0202538 A1 Oct. 30, 2003

(30) Foreign Application Priority Data

Apr. 30, 2002 (DE) .............................. 102 19 342

(51) Int. Cl.
*H04B 7/216* (2006.01)
*H04J 11/00* (2006.01)
(52) U.S. Cl. ...................... 370/342; 370/335; 370/441; 370/203
(58) Field of Classification Search .................... None
See application file for complete search history.

(56) References Cited

U.S. PATENT DOCUMENTS

| | | | |
|---|---|---|---|
| 6,289,000 B1 * | 9/2001 | Yonge, III | 370/203 |
| 6,798,736 B1 * | 9/2004 | Black et al. | 370/208 |
| 6,928,066 B1 * | 8/2005 | Moon et al. | 370/342 |
| 2005/0157692 A1 * | 7/2005 | Gerakoulis | 370/342 |
| 2005/0163066 A1 * | 7/2005 | Gerakoulis | 370/320 |

FOREIGN PATENT DOCUMENTS

| DE | 198 32 554 A1 | 2/2000 |
|---|---|---|
| DE | 199 53 349 A1 | 6/2001 |

* cited by examiner

*Primary Examiner*—Chirag G. Shah
(74) *Attorney, Agent, or Firm*—Caesar, Rivise, Bernstein, Cohen & Pokotilow, Ltd.

(57) ABSTRACT

Procedure for determining length ($L_{preamble}$) of a standard code sequence (preamble) transmitted in a CDMA signal in a defined code channel having a different code class than the code class of the at least one code channel, in which before and/or after the standard code sequence, data are transmitted, includes: (a) determining a chip sequence of the CDMA signal corresponding to an assumed hypothetical length ($L_{hyp}$) of the standard code sequence; (b) generating a symbol-sequence by decoding the chip sequence; (c) determining an estimated value of the performance ($\hat{P}_{hyp}$) of the symbol sequence; (d) determining whether the estimated value of the performance ($\hat{P}_{hyp}$) of the symbol sequence of the assumed hypothetical length ($L_{hyp}$) of the standard code sequence understeps a predetermined threshold value; and (e) deciding that the standard code sequence is correct when ($\hat{P}_{hyp}$) understeps the predetermined threshold value.

11 Claims, 1 Drawing Sheet

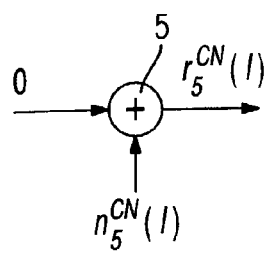 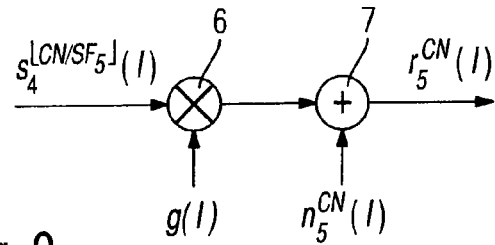
Fig. 1　　Fig. 2
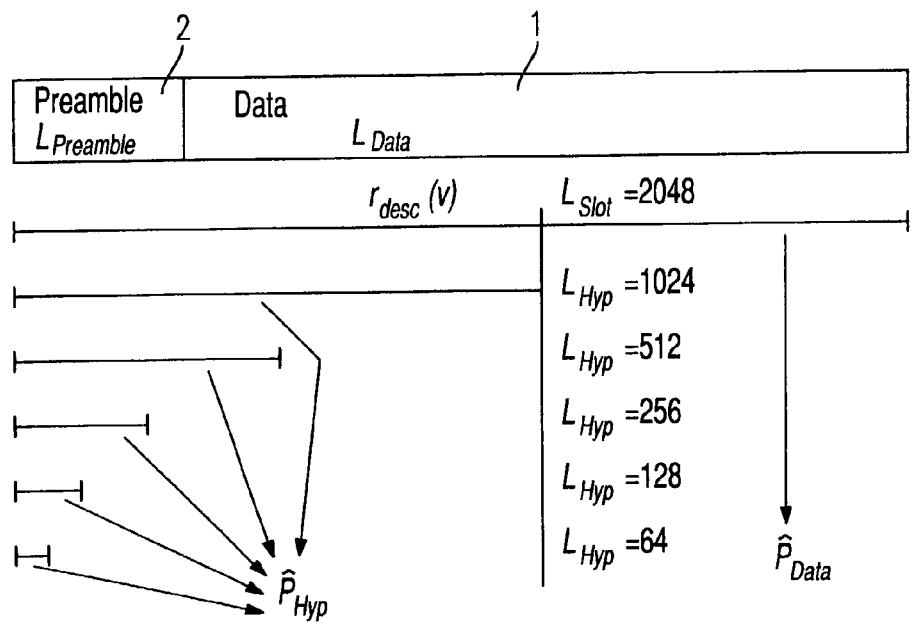
Fig. 3
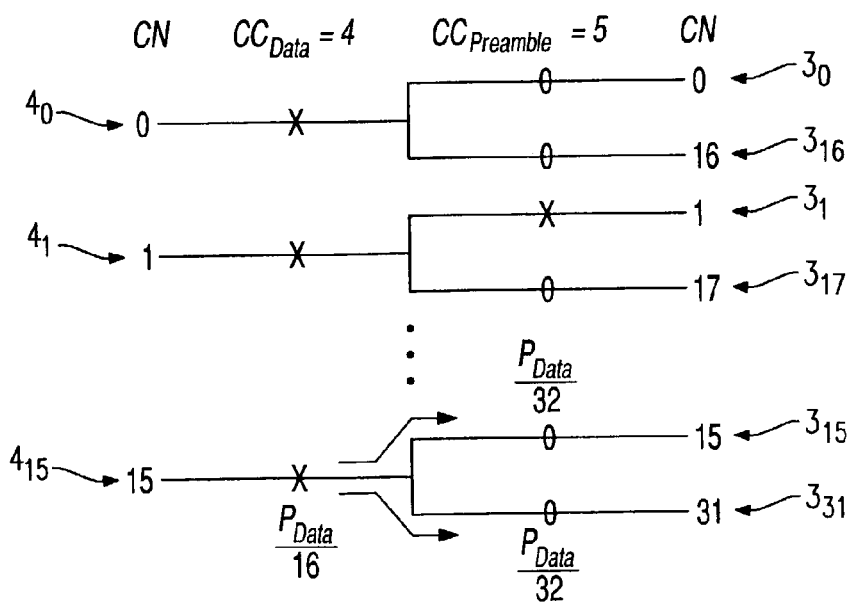
Fig. 4

PROCEDURE FOR THE DETERMINATION OF THE LENGTH OF A STANDARD CODE SEQUENCE OF A CDMA SIGNAL

BACKGROUND OF THE INVENTION

The invention concerns a procedure for the determination of the length of a standard code sequence of a CDMA (Code Division Multiple Access) signal. In the case of the standard code sequence, the involved matter is a standardized code sequence transmitted in a defined code channel. The standard code sequence can, for example, be placed before the data to be transmitted, thus being the "preamble", or also in the middle of the transmitted data, thus becoming the "midamble".

CDMA signals encompass a plurality of code channels, which, channels respectively, are separated by different, orthogonal, spread-codes, and are simultaneously transmitted. After the separation a scrambling is effected with a scrambling code. The present invention is employed for the detection of the preamble length of a CDMA signal from the base stations of the 1×EV-DO Mobile Radio systems. This standard is described in detail by the document 3GPP2, Cdma2000 High Rate Packet Data Air Interface Specification (3GPP2, C. S0024) Chapter 9.3 of Aug. 23, 2001).

The CDMA signal in accord with the above signal, is special in that the data sequence precedes a standard code sequence as a preamble, which can have chips of different lengths, namely, 1024, 512, 256, 128, or 64. It can also occur, that no standard code sequence (preamble) is transmitted. Although, in the transmitting of the standard code sequence (preamble) a code channel of the code class $CC_{preamble}=5$, is employed, with a spreading factor $SF=2^5$, then, for the transmission of the data, all code channels of the code class $CC_{data}=4$, are used and in this case, also with a spreading factor $SF=2^4$. For the transmission of the standard code sequence (preamble), besides this, only one code channel is active, whereby, as a rule, it is not known which code channel is involved with which code number CN. The code channel with the number CN=0 is, however, always inactive. For a scenario of a CDMA signal of this type, the necessity arises, of detecting, for instance with a measuring instrument, the length of the standard code sequence (preamble). The length of the standard code sequence (preamble) is not known, and runs, for instance 1024, 512, 256, 128, or 64 chips.

Since cases can be found, in which no standard code sequence (preamble) is transmitted, the determination must be made, as to whether or not indeed any standard code sequence was sent. As to the state of the technology, one may refer to DE 199 53 349 A1. This publication discloses a procedure for the synchronization of a CDMA received signal. A detection of the standard code sequence (preamble), however, is not carried out.

Thus the invention has the purpose of creating a procedure for the determination of the length of a standard code sequence of a CDMA signal and also to create a corresponding computer program, which incorporates a minimum of numerical complexity and can be implemented with small effort, that is, has a short computation time.

SUMMARY OF THE INVENTION

The invention is based on the recognition that the analysis of the length of the standard code sequence, is executed advantageously in a non-occupied analysis code channel, which has the same code class as the code channel of the standard code sequence. Examined, in this respect, are several hypotheses of various hypothetical lengths of the standard code sequence, whereby, a start is made with a hypothesis of the greatest assumed hypothetical length of the standard code sequence. If the assumed hypothetical length of the standard code sequence is correct, then there will be found within the captured sequence of chips, no contribution to finding the data channel, nor, at this point in time, any contribution to determining the sent standard code sequence, since these made use of another code channel of the same code class. If the hypothesis is still missing its mark, that is, is the hypothetical length of the standard code sequence proves longer than the real length of the standard code sequence, then there falls into the evaluated chip sequence a contribution to discovering the data channel, which leads to a higher performance per expression in comparison to that which a correct hypothesis would lead to. By the choice of an appropriate threshold value, a differentiation can be made between a correct and a false hypothesis.

If the estimated value proves less than the said threshold value, then the concept has begun from a correct hypothesis. Otherwise, it can be decided, that the base is a false hypothesis and the procedure should be carried further, this time based on a shorter hypothetical length of the standard code sequence. This procedure is carried on to a point, that, because of an understepping of the performance threshold, the indication is made of a correct hypothesis and accordingly, a defined length of the standard code sequence is decided upon, or, in case the threshold is overstepped, even by the shortest possible length of the standard code sequence, the stance can be, that no standard code sequence (preamble) exists in the CDMA signal being evaluated.

The subordinate claims enable advantageous developments of the invention.

The procedure is carried out advantageously for several non-occupied analysis code channels and a majority-decision in regard to the evaluated analysis code channel leads to an increase in the accuracy and reliability of the procedure.

By means of an appropriate threshold for the performance judgment, the reliability of the procedure can, likewise, be favorably affected.

BRIEF DESCRIPTION OF SEVERAL VIEWS OF THE DRAWINGS

An embodiment example of the invention is more closely described and explained with the aid of the drawing. There is shown in:

FIG. 1 a block circuit diagram for a transmission model of the expression of the analysis code channel for a correct hypothesis of the length of the standard code sequence;

FIG. 2 a block circuit diagram for a transmission model of the expression of the analysis code channel for a false hypothesis of the length of the standard code sequence;

FIG. 3 a schematic presentation for the explanation of the invented procedure, and FIG. 4 a schematic presentation of the code classes and code channels for the transmission of the data and for the transmission of the standard code sequence (preamble).

DETAILED DESCRIPTION OF PREFERRED EMBODIMENTS OF THE INVENTION

In the following the invented procedure, with the aid of an embodiment example, is described in greater detail. In the following mathematical presentation, the following expressions are used:

| | |
|---|---|
| v | time index on the chip plane, |
| CC | code class of a spreader code, |
| CN | code number of a spreader code, |
| E{ . . . } | expected value operator, |
| g(l) | time dependent amplification factor, |
| l | time index on the symbol plane, |
| $L_{data}$ | number of the chips, with which the capacity in the data zone of a slot is estimated, |
| $L_{hyp}$ | length of the preamble in chips for a hypothesis, |
| $L_{preamble}$ | real length of a preamble, |
| $n_{CC}^{CN}(l)$ | disturbance in a code channel, which uses a spreader code of the code class CC and the code number CN, |
| $\hat{P}_{hyp}$ | estimated value of capacity of the symbol in the analysis code channel for a hypothesis, |
| $\hat{P}_{data}$ | estimated value of the total capacity in the area of a slot, in which data for all preamble length data are transmitted, |
| $r_{desc}(v)$ | scrambled measurement signal, |
| $r_{CC}^{CN}(l)$ | symbol of a code channel, which uses a spreader code of the code class CC and the code number CN, |
| $SF_{CC}$ | Spreader factor of a spreader code in the code class CC, and |
| $w_{CC}^{CN}(v)$ | spreader code in the code class CC with the code number CN |

In the following, as an embodiment example, a detection procedure is presented for the determination of preamble lengths in a CDMA signal of a base station of the 1×EV-DO-Mobile Radio System. With the invented procedure it is quite possible to assess the length of a standard code sequence, whereby, in the case of a standard code sequence, as in the embodiment example, the concern may well be with a preamble ahead of the data area, but could possibly also be in regard to a midamble located between two data areas.

A slot is subdivided into different zones. There is, as is shown in FIG. 3, a zone 1, in which only data are transmitted, and a zone 2, wherein a standard code sequence, (hereinafter referred to as "preamble") is transmitted. If no preamble is transmitted, then the preamble zone 2 is employed for the carrying of data. In the example in FIG. 3, shown in the uppermost line, the preamble length $L_{preamble}$ is 256 chips. There is, however, also the case in which the preamble runs 1024, 512, 128, or 64 chips. The possibility also exists, that no preamble at all is present. The invented procedure serves the purpose of determining, whether indeed any preamble exists and if such is the case, to define its length.

The data and the preamble are transmitted in different code channels, which employ orthogonal spread codes (in the embodiment example "walsh codes") for the separation of the channels. This is schematically presented in FIG. 4. The preamble code channel $3_1$ in the embodiment example of the 1×EV-DO-Mobile Radio System uses a walsh code from the code class $CC_{preamble}$=5 and the data code channels $4_0$–$4_{15}$ employ respectively a walsh code from the class $CC_{data}$=4. For the transmission of the data in data zone 1, all code channels from the code class CC=4 are used, while for the transmission of the preamble, only one code channel from the code class CC=5 is employed. In the example presented in FIG. 4, for the transmission, the preamble of the code channel $3_1$ with the code number CN=1 is used, which is designated by an X. All further code channels of the code class CC=5 are not used, which is indicated in FIG. 4 by a 0. The code channel $3_0$, which makes use of the walsh code with the code number CN=0, is in not in any case to be used as a preamble code channel.

All code channels $4_0$–$4_{15}$ for the transmission of data, use the same sending performance, that is, all data code channels $4_0$–$4_{15}$ of the code class CC=4 are active in data zone 1, however, in data zone 2, not active. In the data zone 1 each of the 16 code channels of the code class CC=4 have, on this account, the performance $P_{data}/16$ which, in the code channels of the code class CC=5 exhibits a performance $P_{data}/32$.

The preamble can have a different length. There are preamble lengths, as may be seen in FIG. 3, used with 1024, 512, 256, 128, 64, or 0 chips. The preamble is, in the case of the embodiment example, always transmitted at the beginning of a slot.

The invented procedure for the detection of the preamble length, is based on a performance estimate for different hypotheses of the preamble length in one analysis code channel, which uses a spreader code from the code class CC=5. The spreader code of the analysis code channel should not be used by the preamble code channel $3_1$ as a spreader code. It offers itself as an analysis code channel particularly to the code channel $3_0$, with the code number CN=0, which is never used in the code class CC=5 for the transmission of the preamble. Which code channel is used for the transmission of the preamble is, as a rule, not known. In order to make certain, which preamble length $L_{preamble}$ is present in the received CDMA signal, several hypotheses with corresponding hypothetical preamble lengths are formed with the chips:

$$L_{hyp}=1024, L_{hyp}=512, L_{hyp}=256, L_{hyp}=128 \text{ and } L_{hyp}=64$$

In FIG. 1 the transmission model for the expression of the analysis code channel 3 for a correct hypothesis is presented. In case the hypothesis of the preamble length from the sender agrees, then the analysis code channel expression:

$$s_5^{CN}(l)=n_5^{CN}(l) \quad (1)$$

consists only from a complex valued interference $n_5^{CN}(l)$. In the adder, 5 of the model, this interference is added to an input signal which is identical to zero.

In case the hypothesis is off its mark, then the symbols combine the complex valued interference $n_5^{0}(l)$ with the—as seen in FIG. 2—

$$s_5^{CN}(l)=g(l) \cdot s_4^{[CN/SFs]}(l)+n_5^{CN}(l) \quad (2)$$

of the analysis code channel taken from that with the time dependent amplification factor g(l) amplified performance-normalized expressions $s_4^{[CN/SFs]}(l)$ of a data channel (for the exemplary analysis code channel $3_0$ of the code number CN=0 of the code class CC=5, this being the data channel $4_0$ with the code number CN=0 of the code class CC=4). In the multiplier 6 of the model, the signal $s_4^{[CN/SFs]}(l)$ is multiplied with the amplification factor g(l). In the adder 7 the interference $n_5^{0}(l)$ is added. The time dependent amplification factor depends on the employed preamble length of the sender.

From the time independent amplification factor g(l) of the data channel of the sender, depends the sent signal expression $s_4^{[CN/SFs]}(l)$ of the data channel in the code class CC=4 and the code number CN of the analysis code channel.

For the detection of the length of the sent preamble, as illustrated in FIG. 3, successive, hypotheses were tested, one after the other. First the hypothesis was investigated wherein the preamble length $L_{hyp}$ ran 1024. If this was discarded, subsequently the hypotheses, wherein the preamble length showed $L_{hyp}$ 512, 256, 128 or 64 chips were tested, until one proved correct. If a hypothesis appeared as correct, then the assumption was made, that no preamble was sent.

In the following, the decisive criterion is described, with which the test was made as to whether or not a hypothesis should be regarded as correct or should be discarded. Since in the preamble zone 2 of a slot, in the case of a valid hypothesis, no data are transmitted, then in that place, in the analysis code channel $3_{CN}$ (for example, CN=0) only the noise performance was measured. If the hypothesis is invalid, then the performance estimation value of the preamble performance forms itself out of the noise performance, and out of the performance of a data code channel $4_{CN}$ (in the example, CN=0). With a threshold decision, these two cases can be differentiated from one another.

For the test of a hypothesis, in the first step, the expressions:

$$r_5^{CN}(hyp, l) = \frac{1}{SF_5} \cdot \sum_{v=0}^{SF_5-1} r_{desc}(SF_5 \cdot l + v) \cdot w_5^{CN}(v) \quad (3)$$

of the analysis code channel $3_{CN}$ for the hypotheses, wherein the preamble length $L_{hyp}$ runs in the range of 1024, 512, 256, 128, or 64, are first scrambled and then decoded. In this matter, $SF_5$ the spread factor of the analysis code channel $3_{CN}$, $w_5^{CN}(v)$ the walsh code of the analysis code channel $3_{CN}$ and $r_{desc}(v)$ the scrambled, received CDMA signal. Subsequently the average performance of the analysis code channel $$\hat{P}_{hyp} = \frac{1}{L_{hyp}} \sum_{l=0}^{L_{hyp}-1} |r_5^{CN}(hyp, l)|^2 \quad (4)$$

of the hypothesis can be calculated.

If the estimated value does not reach the expected performance of a hypothesis, then the performance threshold, namely:

$$\frac{\hat{P}_{hyp}}{\hat{P}_{data}} < \frac{k}{2 \cdot SF_5} \quad (5)$$

with then decide, that the hypothesis is valid and the search will be halted. In this matter, the following is:

$$\hat{P}_{data} = \frac{1}{L_{data}} \cdot \sum_{v=0}^{L_{data}-1} |r_{desc}(v + \text{offset})|^2 \quad (6)$$

the estimated value of the total performance in the date zone 1 of a slot, if it is assumed, that the longest preamble in the example with 1024 chips is transmitted. The offset is employed, in order that the performance of the entire signal is always to be estimated in the data zone 1 of a slot. That is, for the estimation per chip of the performance $\hat{P}_{data}$ in the data zone 1, an offset is always used, which is large enough, that the chips which are entering into the evaluation of $\hat{P}_{data}$ originate also from the longest possible preamble (in the example this is 1024 chips) from the data zone 1.

In the following, the investigation is carried on, as to how the k-factor of the decision threshold is to be dimensioned. If a preamble of the length $L_{preamble}$ is transmitted and a hypothesis with the preamble length $L_{hyp}$ is tested, then there becomes available the expectation value of the performance estimation value of the hypothesis at:

$$E\{\hat{P}_{hyp}\} = \frac{1}{SF_5} \cdot E\{|n(v)|^2\} + \frac{L_{hyp} - L_{preamble}}{L_{hyp}} \cdot \frac{P_{data}}{SF_5}, \quad (7)$$

in case the performance of the data code channel $4_{CN}$ is equal to the code class CC=4, as it is presented schematically in FIG. 4, then, in all code channels $3_{CN}$ will couple into the analysis code class CC=5. Accordingly, $E\{|n(v)|^2\}$ is the performance of the interference on the chip plane and $P_{data}$ is the entire performance of all data code channels $4_{CN}$. The first summand in equation (7) presents the interference, which, in the zone of the hypothesis length $L_{hyp}$ which supports the preamble, and which enters again in the subsequent data zone.

This means, that the performance estimated value, i.e., $\hat{P}_{hyp}$ is at its smallest for that invalid hypothesis, at which $L_{hyp}=2L_{preamble}$. The decisive threshold is, with the parameter k in Equation (5) is now so dimensioned, that in this critical border case, still a correct decision can be made. For this case, there arises from an optimal decision threshold for $$k = \frac{1}{2}$$

in equation (5). Since it is not yet assured, that the performance of the data channel $4_{CN}$ is equally subdivided on all code channels $3_{CN}$ of the analysis code class CC=5, a safety measure must be held to the theoretical threshold from equation (7). For this purpose, a k-factor approximating the order of magnitude of ½ should be chosen.

Since the performance of the data channel $4_{CN}$, in extreme cases where unfavorable data channel symbol sequences partition themselves up very unequally on the code channel $3_{CN}$ of the analysis code class CC=5, it is well to consider, that the above described procedure should be run in several, or indeed in all analysis channels $3_{CN}$, if necessary, in FIG. 4, and all detection results of all analysis code channels be evaluated. For this purpose, the above described procedure can be employed.

That hypothesis is to be decided as valid, with which the highest number of individual detection results occur (majority decision). It isn't harmful, if even that code channel, which as a rule is unknown, (in the example of FIG. 4, this would be the code channel $3_1$) is brought into the evaluation, with which the preamble is supported, since this "maverick" does not affect the majority decision. With the widened procedure, the faulty detection probability is clearly reduced.

With the invented procedure, there arises thus a sure capture of the preamble length, that is, generally, the length of the standard code sequence.

The invention claimed is:

1. A process for determining a length ($L_{preamble}$) of a standard code sequence (preamble) transmitted in a CDMA signal in a defined code channel code class ($CC_{preamble}$) than the code class ($CC_{data}$) and having at least one code channel, in which before and/or after the standard code sequence, data are transmitted, wherein said process has the following steps:
  a) determination of a chip sequence of the CDMA signal in accord with an assumed hypothetical length ($L_{hyp}$) of the standard code sequence,
  b) generation of a symbol-sequence by decoding of the chip sequence with a code ($w_5^{CN}(v)$) of at least one of the standard code sequence non-occupied analysis code channel, which has the same code class ($CC_{preamble}$) as the code channel of the standard code sequence;
  c) determination of an estimated value of a performance ($\hat{P}_{hyp}$) of the symbol sequence, wherein the performance corresponds to the hypothetical length ($L_{hyp}$) of the standard code sequence;
  d) determine, as to whether or not, the estimated value of the performance ($\hat{P}_{hyp}$) of the symbol sequence of the assumed hypothetical length ($L_{hyp}$) of the standard code sequence understeps a predetermined threshold value;
  e) for the case, that the estimated value of the performance ($\hat{P}_{hyp}$) of the symbol sequence of the assumed hypothetical length ($L_{hyp}$), of the standard code sequence, understeps the predetermined threshold value, make the decision that the assumed hypothetical length ($L_{hyp}$) of the standard code sequence is correct;
  f) for the case, that the estimated value of the performance ($\hat{P}_{hyp}$) of the symbol sequence of the assumed hypothetical length ($L_{hyp}$), of the standard code sequence does not understep the predetermined threshold value, undertake successive repetition of steps a) to e) with successively lesser assumed hypothetical lengths ($L_{hyp}$) of the standard code sequence; and
  g) decoding the CDMA signal based on the determined hypothetical length ($L_{hyp}$) of the standard code sequence.

2. The process of claim 1, for the case in which the estimated value of the performance ($\hat{P}_{hyp}$) of the symbol sequence does not understep the predetermined threshold value, then the decision is to be made that no standard code sequence exists in the CDMA signal.

3. The process of claim 1, wherein steps a) to f) are carried out for a plurality of analysis code channels, which have the same code class ($CC_{preamble}$) as the code channel, and that particular hypothetical length ($L_{hyp}$) of the standard code sequence is to be considered as correct, which agrees with the most evaluated analysis code channels.

4. The process of claim 1, wherein before the decoding, a scrambling of the CDMA signal is carried out and in the case of the decoding, the relationship:

$$r_5^{CN}(hyp, l) = \frac{1}{SF_5} \cdot \sum_{v=0}^{SF_5-1} r_{desc}(SF_5 \cdot l + v) \cdot w_5^{CN}(v)$$

is used, wherein
  $SF_5$ is the spreader factor of the analytic code channel
  $W_5^{CN}(v)$ is the code of the analytic code channel
  $r_{desc}(v)$ is the scrambled CDMA—signal
  $l$ is the time—index on the symbol plane and the code number of the analytic code channel CN.

5. The process of claim 4, wherein in the case of the determination of the estimated value of the performance ($\hat{P}_{hyp}$) of the symbol sequence of the assumed hypothetical length ($L_{hyp}$) of the standard-code sequence, the relationship:

$$\hat{P}_{hyp} = \frac{1}{L_{hyp}} \sum_{l=0}^{L_{hyp}-1} |r_5^{CN}(hyp, l)|^2$$

is used, wherein $L_{hyp}$ is the hypothetical length of the standard code sequence.

6. The process of claim 5, wherein the threshold value of the estimated performance ($\hat{P}_{hyp}$) arises from the equation $$\frac{\hat{P}_{hyp}}{\hat{P}_{data}} < k \cdot \frac{1}{2SF_5}$$

wherein:
  $\hat{P}_{data}$ is an estimated value of the performance in a zone 1 in which with each hypothetical length ($L_{hyp}$) of the standard code sequence only data and no standard code sequences are transmitted and k denotes a constant threshold factor value.

7. The process of claim 6, wherein the threshold factor k is equal to ½.

8. The process of claim 7, wherein the following equation is true:

$$\hat{P}_{data} = \frac{1}{L_{data}} \cdot \sum_{v=0}^{L_{data}-1} |r_{desc}(v + \text{offset})|^2$$

wherein:
  $L_{data}$ denotes an optional number of chips, which enter into the computation of an estimated value of the performance $\hat{P}_{data}$, in a zone 1, in which, in the case of each hypothetical length ($L_{hyp}$) of the standard code sequence, only data and no standard code sequence can be transmitted.
  offset represents a corresponding displacement of chips.

9. The process of claim 1, wherein the code class ($CC_{preamble}$) of the analysis code channel is greater than the code class ($CC_{data}$) of the at least one code channel for the transmission of data.

10. A computer readable medium comprising a computer program with a program code having instructions stored thereon for executing the processes of steps a)-f) of claim 1, when the program is carried out in a computer or a digital micro processor.

11. A digital storage medium having a program encoded thereon with instructions executed by a computer or a digital signal processor, so that the processes of steps a)-f) of claim 1 can be carried out.

* * * * *